United States Patent
Rao et al.

(10) Patent No.: US 12,289,331 B2
(45) Date of Patent: Apr. 29, 2025

(54) METHODS AND SYSTEMS FOR LOCATING ANOMALOUS QUERY ACTIVITY ON DATA STORES

(71) Applicants: Supreeth Hosur Nagesh Rao, Cupertino, CA (US); Navindra Yadav, Cupertino, CA (US); Ravi Sankuratri, Cupertino, CA (US); Alok Lalit Wadhwa, Milipitas, CA (US); Aria Rahadian, San Jose, CA (US); Brady Schulman, Milford, NH (US); Ravi Shanker Prasad, Fremont, CA (US); Vasil Dochkov Yordanov, San Jose, CA (US); Yiwei Wang, San Jose, CA (US); Zhiwen Zhang, San Jose, CA (US); Udayan Joshi, San Diego, CA (US); Soumyadeep Choudhury, San Jose, CA (US); Muhammada Furqan, Lowell, MA (US); Danesh Irani, San Carlos, CA (US)

(72) Inventors: Supreeth Hosur Nagesh Rao, Cupertino, CA (US); Navindra Yadav, Cupertino, CA (US); Ravi Sankuratri, Cupertino, CA (US); Alok Lalit Wadhwa, Milipitas, CA (US); Aria Rahadian, San Jose, CA (US); Brady Schulman, Milford, NH (US); Ravi Shanker Prasad, Fremont, CA (US); Vasil Dochkov Yordanov, San Jose, CA (US); Yiwei Wang, San Jose, CA (US); Zhiwen Zhang, San Jose, CA (US); Udayan Joshi, San Diego, CA (US); Soumyadeep Choudhury, San Jose, CA (US); Muhammada Furqan, Lowell, MA (US); Danesh Irani, San Carlos, CA (US)

( * ) Notice: Subject to any disclaimer, the term of this patent is extended or adjusted under 35 U.S.C. 154(b) by 203 days.

(21) Appl. No.: 17/829,361

(22) Filed: Jun. 1, 2022

(65) Prior Publication Data
US 2023/0018068 A1 Jan. 19, 2023

Related U.S. Application Data

(63) Continuation-in-part of application No. 17/335,932, filed on Jun. 1, 2021, now Pat. No. 12,010,124.
(Continued)

(51) Int. Cl.
H04L 9/40 (2022.01)

(52) U.S. Cl.
CPC .............................. *H04L 63/1425* (2013.01)

(58) Field of Classification Search
CPC ................................................ H04L 63/1425
See application file for complete search history.

(56) References Cited

U.S. PATENT DOCUMENTS

| | | | |
|---|---|---|---|
| 10,986,131 B1 * | 4/2021 | Kruse | H04L 63/10 |
| 2020/0259852 A1 * | 8/2020 | Wolff | H04L 67/10 |
| 2022/0198015 A1 * | 6/2022 | Webster | G06F 21/57 |

* cited by examiner

Primary Examiner — Thaddeus J Plecha (57) ABSTRACT

In one aspect, a computerized system for locating anomalous query activity with a cloud-based database, comprising: with an atypical query engine: analyzing and understanding data within a cloud-based database, processing all accesses to the data within cloud-based database and SAAS environment, generating a list of user that accesses a table from a location in the cloud-based database using, and capture a set of specified key statistics about the cloud-based database query; and role suggestion engine: generating a user behavior fingerprint comprising a history of the user's behavior within the cloud-based database, identifying that a user is an outlier with respect to behavior with respect to the set of specified key statistics, and suggesting a new role within an (Continued)

enterprise managing the cloud-based database for the user, wherein the fingerprint of the outlier user is used to generate the suggestion for the new role.

16 Claims, 7 Drawing Sheets

Related U.S. Application Data

(60) Provisional application No. 63/153,362, filed on Feb. 24, 2021.

METHODS AND SYSTEMS FOR LOCATING ANOMALOUS QUERY ACTIVITY ON DATA STORES

CLAIM OF PRIORITY

This application claims priority to the U.S. patent application Ser. No. 17/335,932, filed on Jun. 1, 2021 and titled METHODS AND SYSTEMS FOR PREVENTION OF VENDOR DATA ABUSE. The U.S. patent application Ser. No. 17/335,932 is hereby incorporated by reference in its entirety.

U.S. patent application Ser. No. 17/335,932 application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This utility patent application is incorporated herein by reference in its entirety.

FIELD OF INVENTION

This application is related to cloud-platform security and, more specifically, locating anomalous query activity on data stores.

BACKGROUND

With data being consolidated and shared easily, it's a problem for security teams to provision the right roles, and the right permissions within a role. Additionally, Database as a Service (DBaaS) is becoming very popular in modern-day application architectures. Many apps are built directly on databases which are consumed as a service. As this consolidation onto SaaS data stores happens, many enterprises consolidate their data across business use-cases into a single SaaS Database. In such a scenario, similar to what happens when all the data is stored at the same location, multiple internal and external teams gain access. Cloud computing-based data warehousing systems (e.g., Snowflake® and/or a similar type of system) can make it very easy for sharing data within internal and external teams.

It is also noted that the cost of a data breach is rising. The per-record cost of a data breach is estimated based on PII/PHI records within data stores. As internal and external threats to data increase, the financial liabilities that a store breach can cause to an enterprise. Risk Leaders are resonating with the messaging that financial liabilities can be estimated for every store or API.

Additionally, the rise of database-as-a-service running a fully managed SaaS offering is making "Sky Computing" real. This is leading to the convergence of data into unified stores. Provisioning the right role and users within such roles is a huge challenge for security teams. The data is easy to share and is a growing asset in most organizations.

SUMMARY OF THE INVENTION

In one aspect, a computerized system for locating anomalous query activity with a cloud-based database, comprising: with an atypical query engine: analyzing and understanding data within a cloud-based database, processing all accesses to the data within cloud-based database and SAAS environment, generating a list of user that accesses a table from a location in the cloud-based database using, and capture a set of specified key statistics about the cloud-based database query; and role suggestion engine: generating a user behavior fingerprint comprising a history of the user's behavior within the cloud-based database, identifying that a user is an outlier with respect to behavior with respect to the set of specified key statistics, and suggesting a new role within an enterprise managing the cloud-based database for the user, wherein the fingerprint of the outlier user is used to generate the suggestion for the new role.

The Figures described above are a representative set and are not exhaustive with respect to embodying the invention.

DESCRIPTION

Disclosed are a system, method, and article for locating anomalous query activity on data stores. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. However, one skilled in the relevant art can recognize that the invention may be practiced without one or more of the specific details or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Atypical Query Engine can use data to develop/determine a feature extraction and a query normalization process. During this process referenced objects can be verified and some data type compatibility can be checked. Atypical Query Engine can be used to determine atypical roles and atypical queries.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

Cloud computing is the on-demand availability of computer system resources, especially data storage (e.g. cloud storage) and computing power, without direct active management by the user.

Cloud database is a database that typically runs on a cloud computing platform and access to the database is provided as-a-service.

Cloud storage is a model of computer data storage in which the digital data is stored in logical pools, said to be on "the cloud". The physical storage spans multiple servers (e.g. in multiple locations), and the physical environment is typically owned and managed by a hosting company. These cloud storage providers can keep the data available and accessible, and the physical environment secured, protected, and running.

DBaaS (Database as a Service) can be a cloud computing service that provides access to and use a cloud database system.

Data warehouse can be a system used for reporting and data analysis and is considered a core component of business intelligence.

Mahalanobis distance is a measure of the distance between a point P and a distribution D. It is a multi-dimensional generalization of the idea of measuring how many standard deviations away P is from the mean of D. This distance is zero for P at the mean of D and grows as P moves away from the mean along each principal component axis. The Mahalanobis distance is unitless and scale-invariant. The Mahalanobis distance takes into account the correlations of the data set.

Software as a service (SaaS) is a software licensing and delivery model in which software is licensed on a subscription basis and is centrally hosted.

Example Methods

A methodology is provided to examine a cloud computing-based data warehousing system(s) (e.g. Snowflake® and/or any DB-as-a-service) usage information, map it to users and their respective roles. Using the behaviors of users within a role, the methodology can then map out the right set of users that can be carved into separate roles.

Figure 1:
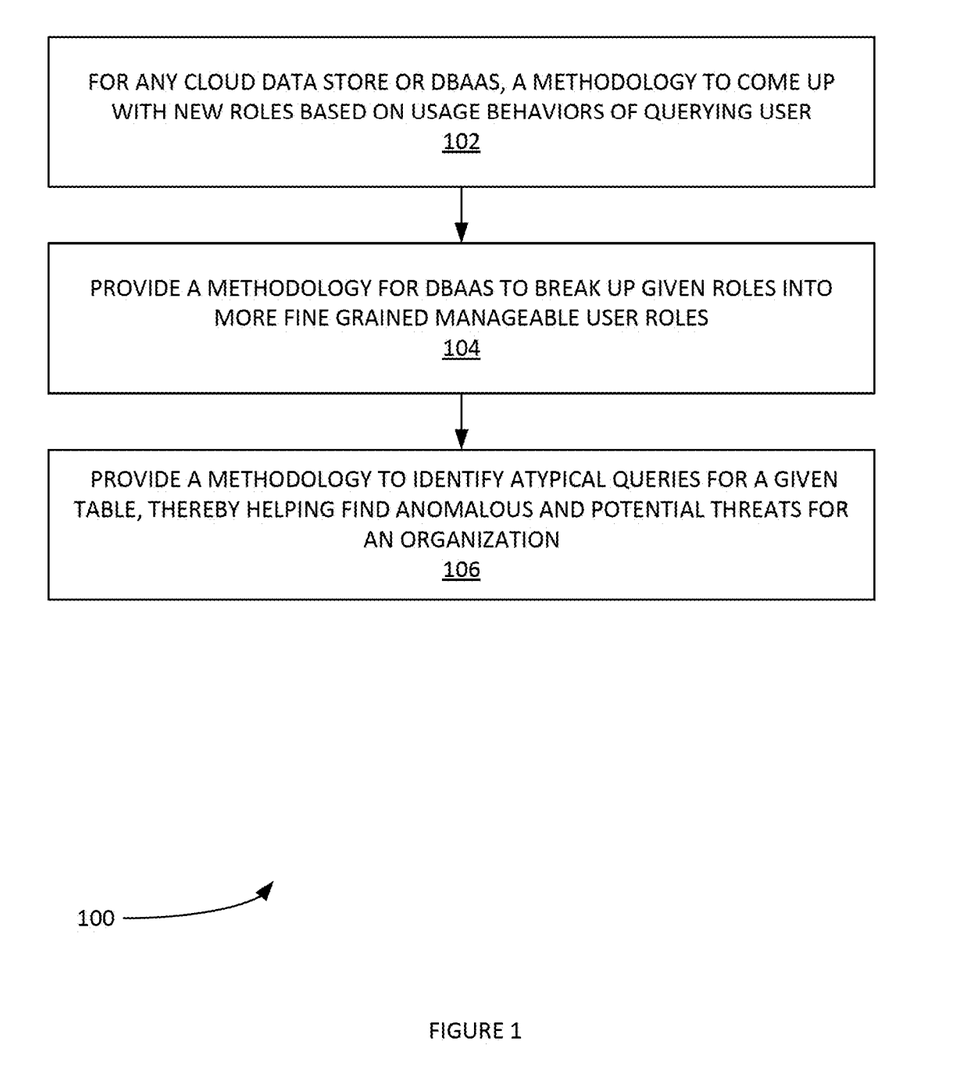
FIG. 1 illustrates an example process for analyzing a datastore, according to some embodiments.

FIG. 1 illustrates an example process 100 for analyzing a datastore, according to some embodiments. In step 102, process 100 can provide a methodology for determining new roles based on usage behaviors of querying users. This can be for any cloud-based data store and/or database as a service (DBaaS). In step 104, process 100 can provide a methodology for DBaaS to break up given roles into more fine-grained manageable user roles. In step 106, process 100 can provide a methodology to identify atypical queries for a given table, thereby helping find anomalous and potential threats for an organization.

Process 100 can be utilized for finer grainer role creation in a specified cloud computing-based data warehousing system(s) (e.g. for Snowflake® systems, etc.). Process 100 can be utilized for user association with various correctly provisioned roles. Process 100 can be utilized for atypical query identification. Atypical query identification can help address potential threats to data as data breaches/leaks.

Figure 2:
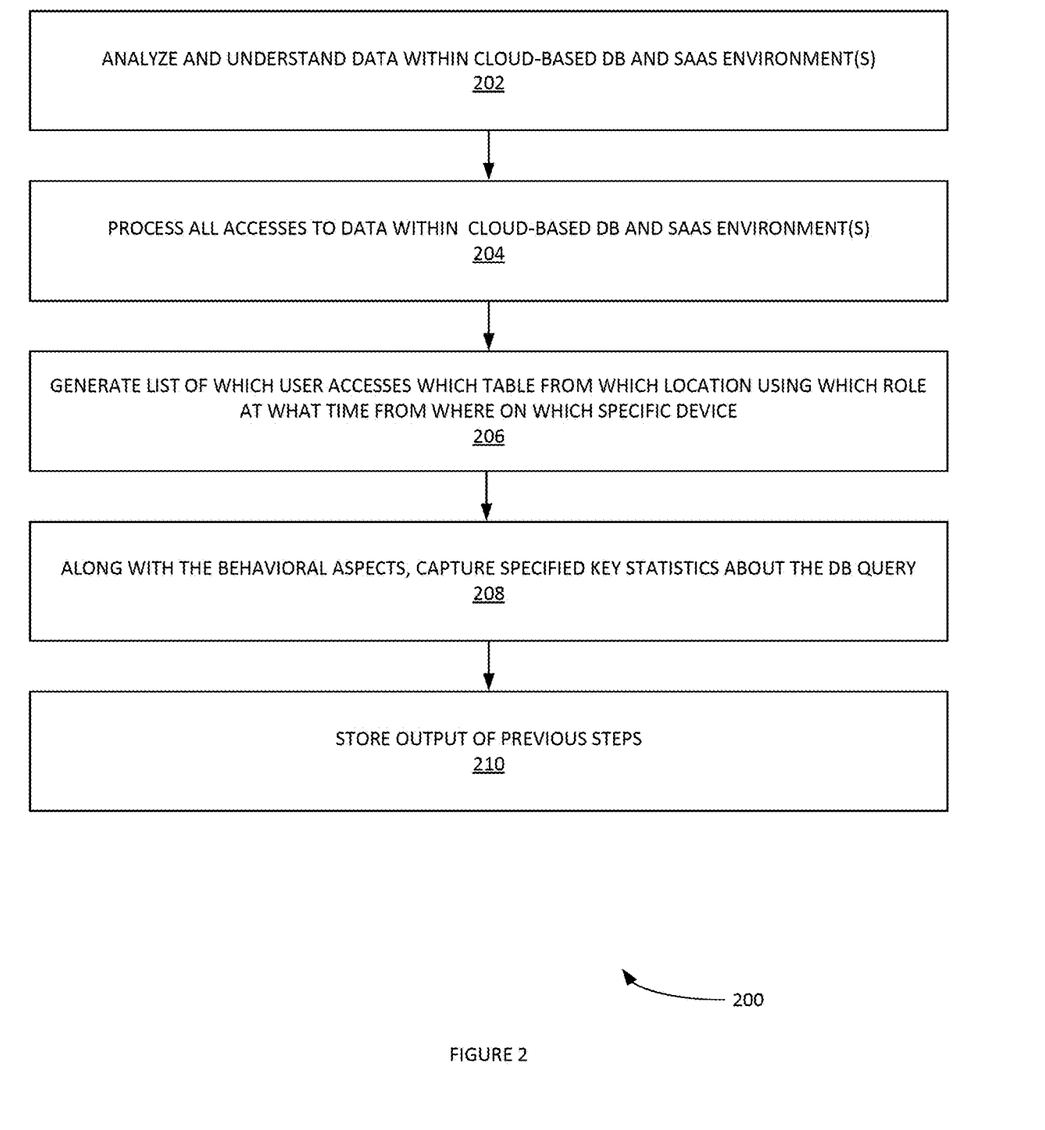
FIG. 2 illustrates another example process for analyzing a datastore, according to some embodiments.

FIG. 2 illustrates another example process 200 for analyzing a datastore, according to some embodiments. In step 202, process 200 can analyze and understand the data within a cloud-based database (DB) and SaaS environment(s). In step 204, process 200 processes all accesses to data within cloud-based DB and SaaS environment(s).

In step 206, process 200 generates a list of various user DB actions/behaviors. These DB actions/behaviors can include inter alia: which user accesses which table from which location using which role at what time from where on which specific device, etc.

In step 208, process 200 can, along with the behavioral aspects, capture specified key statistics about the DB query. These specified key statistics can include, inter alia: "Compilation_time", "Total_elapsed_time", "Rows_produced", "rows_inserted" "Rows_updated", "Rows_deleted", "Bytes_deleted", "Bytes_scanned", "Bytes_written", "Bytes_written_to_result", "Bytes_read_from_result", "Partitions_scanned", etc. In step 210, process 200 can store output of previous steps.

Figure 3:
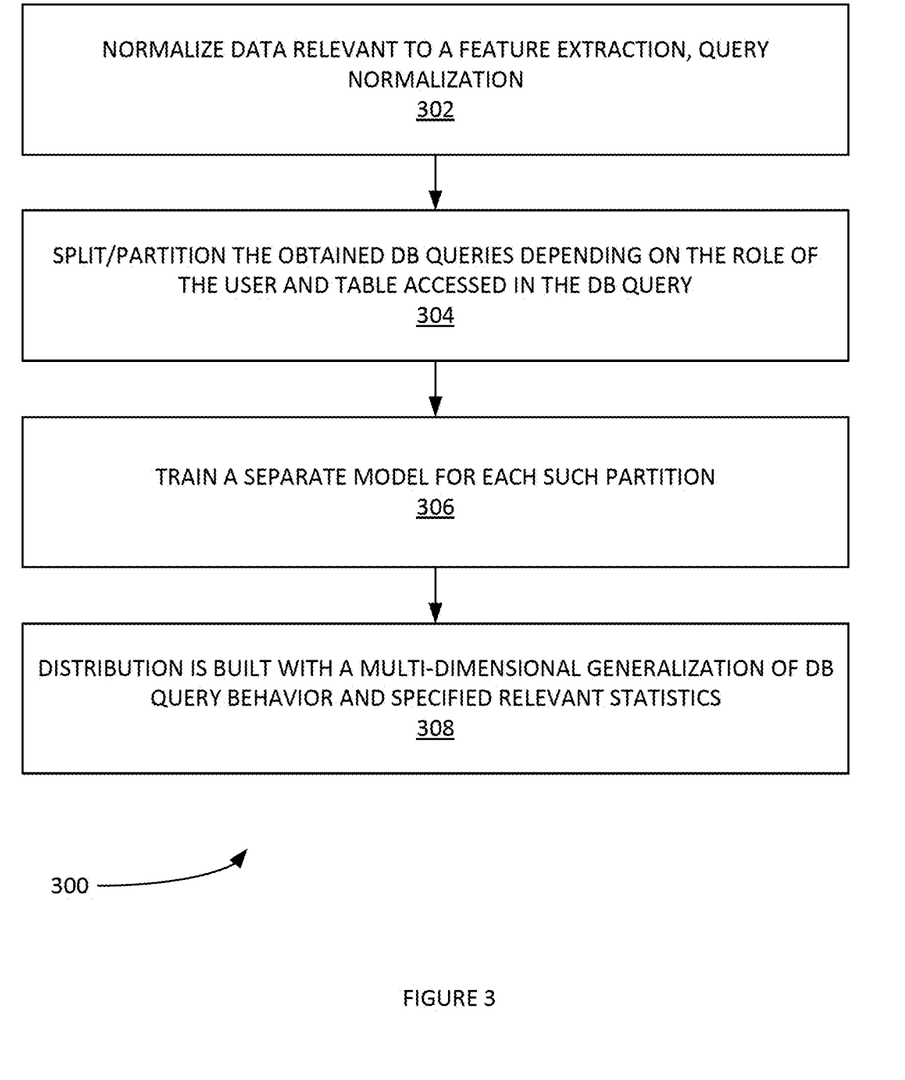
FIG. 3 illustrates an example process for building a model for locating anomalous query activity, according to some embodiments.

FIG. 3 illustrates an example process 300 for building a model for locating anomalous query activity, according to some embodiments. In step 302, process 300 can normalize data relevant to a feature extraction and query normalization. Normalization can mean adjusting feature values measured on different scales to a notionally common scale.

In step 304, process 300 can split/partition the obtained DB queries depending on the role of the user and table accessed in the DB query.

In step 306, process 300 can train a separate model for each such role. Machine learning algorithms can be used to train each model. For each "role" is better; partition is a data storage paradigm. Otherwise, once process 300 replaces the partition with role other points referenced are accepted.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, logistic regression, and/or sparse dictionary learning. Random forests (RF) (e.g. random decision forests) are an ensemble learning method for classification, regression, and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

In step 308, process 300 can build a model's distribution with a multi dimensional generalization of the DB query behavior and specified relevant statistics.

In one example, process 300 can split/partition queries depending on the role of the user and table accessed in the query. Process 300 can then train a separate model for each such partition. The model can use Mahalanobis Distance between a current query and distribution of all other queries in the partition. In one example, process 300 can assume a one percent (1%) pollution of current queries (i.e. assume ninety-nine percent (99%) of current queries are normal). The distribution can be built with a multi-dimensional generalization of the user behavior and key statistics discussed supra.

Figure 4:
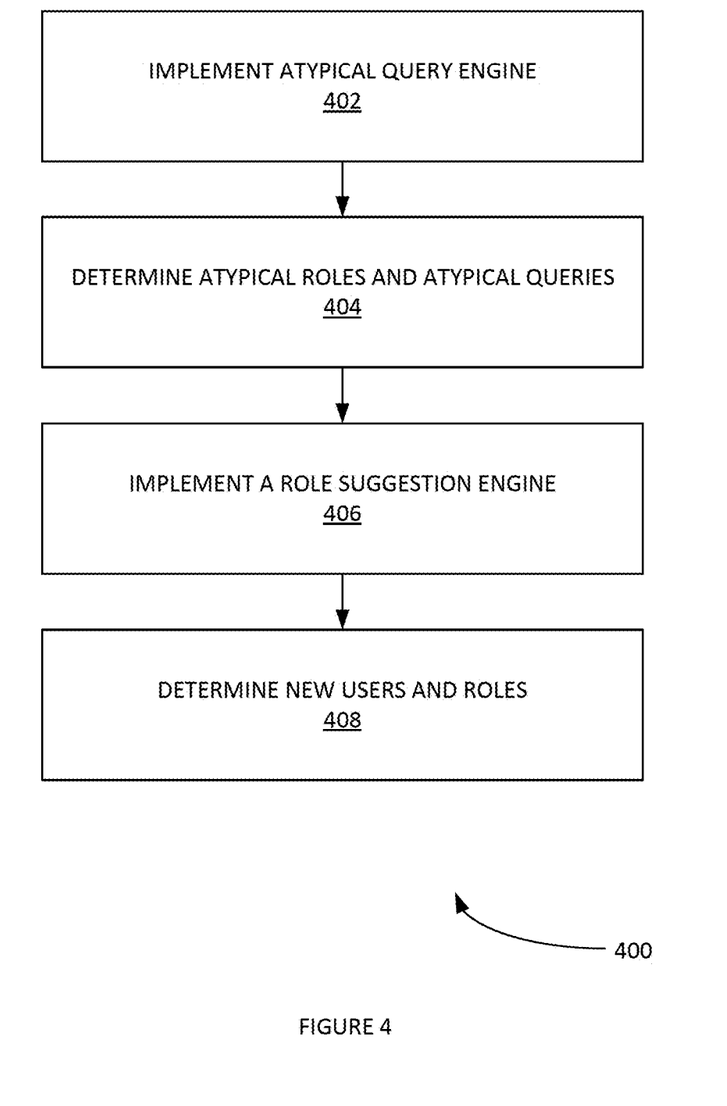
FIG. 4 illustrates an example atypical query engine and role suggestion engine process, according to some embodiments.

FIG. 4 illustrates an example atypical query engine and role suggestion engine process 400, according to some embodiments. In step 402, process 400 can implement atypical query engine. An atypical query engine can look at data and access patterns over number of features. The engine is continuously evaluating if the query that is being done on a table is normal based off other queries from a similar role or fingerprint. As queries and querying users evolve, atypical query engine will understand different fingerprints of access. For example:

The user accessing is querying from a different location or a different time of date Is the user accessing different set of columns within a table either directly or through an application.

These are the scenarios that the atypical engineer can detect.

In step 404, process 400 can determine atypical roles and atypical queries. Example queries are a) users within a role who are querying from a different location than the one in the fingerprint. b) users in a role querying a different set of columns or number of rows than the rest of the users who have helped create the fingerprint.

In step 406, process 400 can implement a role suggestion engine. In step 408, process 400 can determine new users and roles. The role suggestion engine, looks at outliers with respect to users within a role. Using the atypical query module as described above. Once these users are identified, the fingerprint of the outlier user becomes a suggestion for the new role. For example if there is a single user who is accessing at a diff time of day or reading a diff set of rows or columns from a table, the role suggestion engine can suggest to carve out a new role out of the given role with the single user's fingerprint being the role characteristics.

Figure 5:
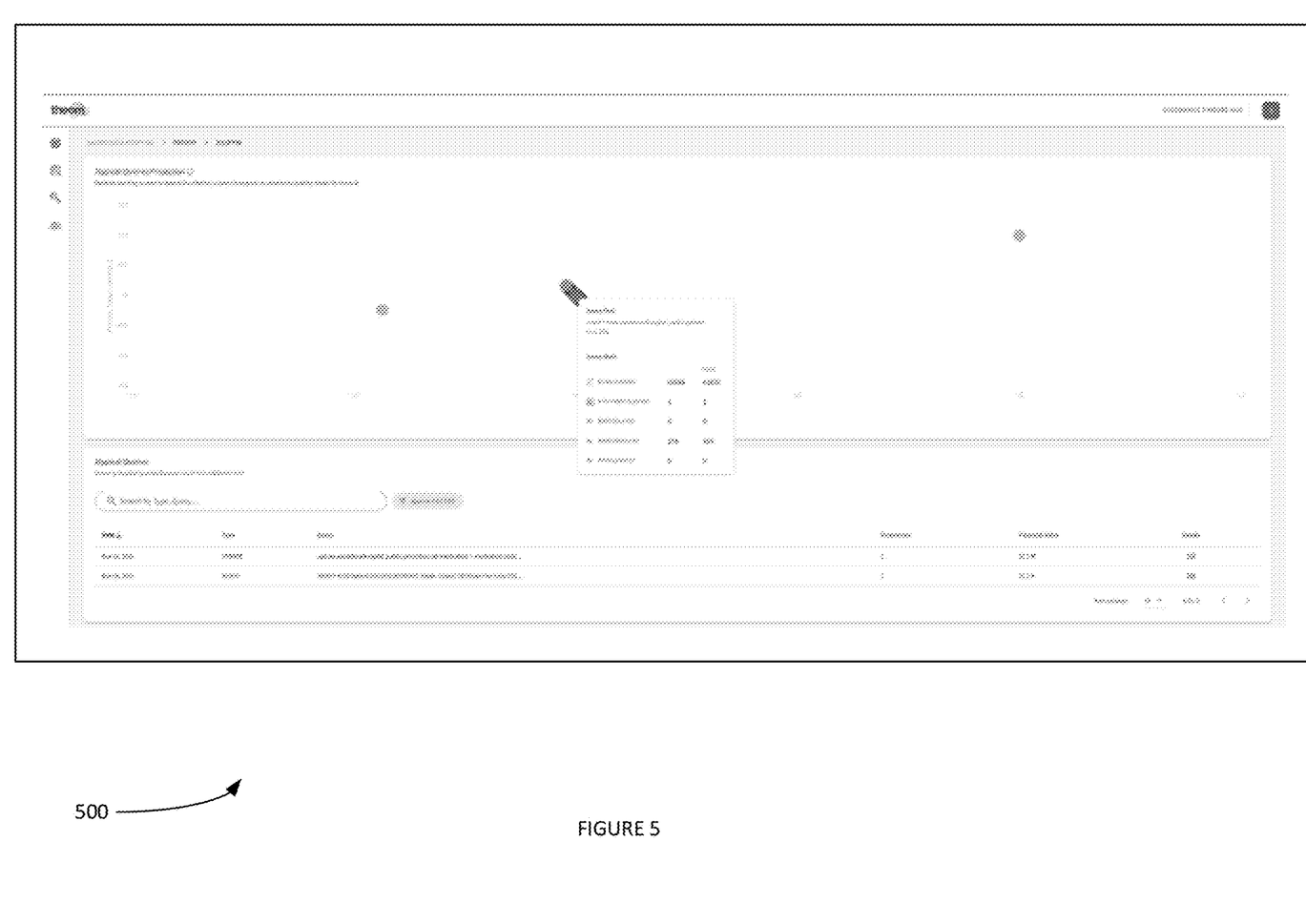
FIG. 5 illustrates an example screen shot of finding a normal for a role, according to some embodiments.

FIG. 5 illustrates an example screen shot 500 of finding a normal for a role, according to some embodiments. As seen in the image the normal for the role is determined by a varied set of features for example a) Location of access, b) time of access c) #rows typically queried d) columns queried e) partitions queried.

Figure 6:
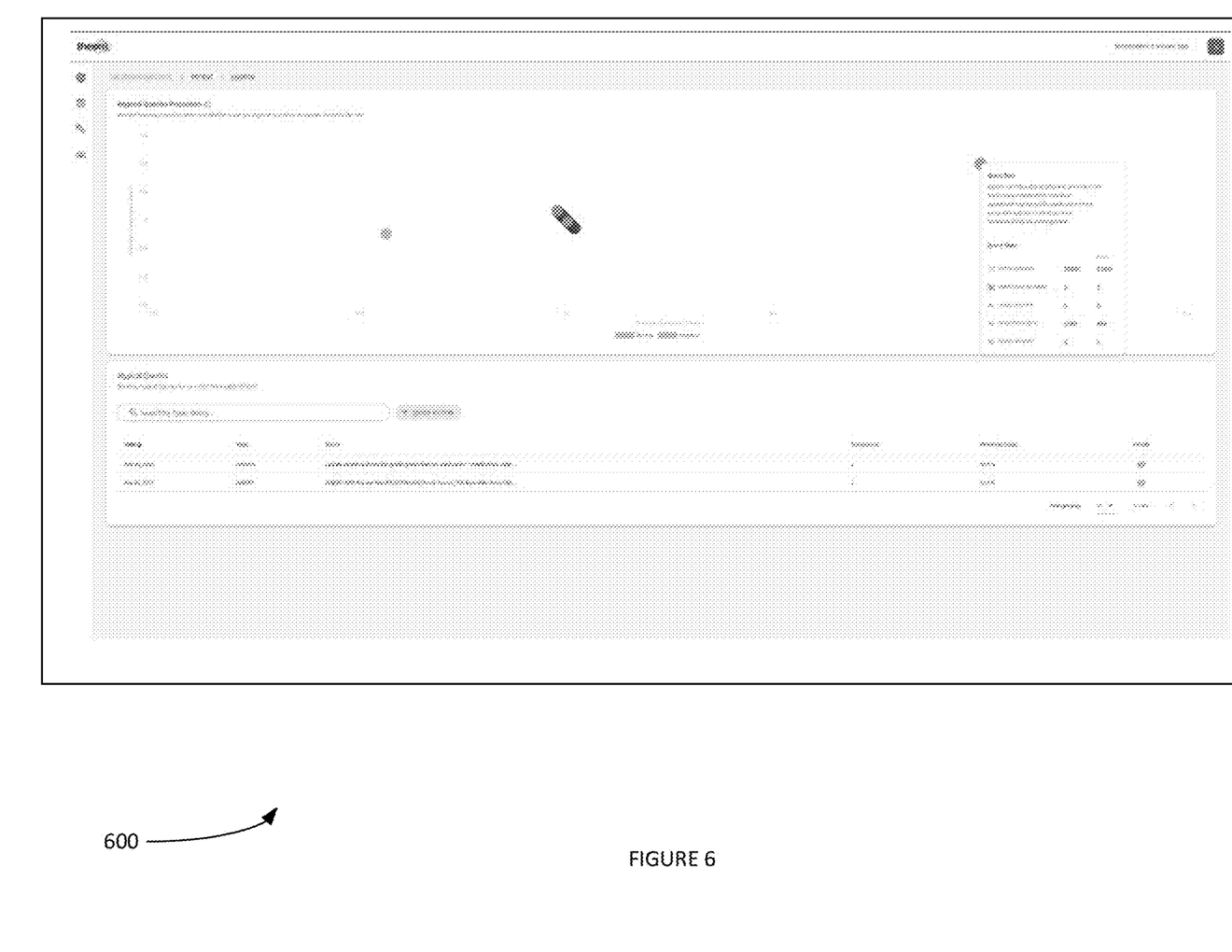
FIG. 6 illustrates an example screen shot of finding an abnormal for a role, according to some embodiments.

FIG. 6 illustrates an example screen shot 600 of finding an abnormal for a role, according to some embodiments. As shown, an atypical query engine can be used to determine outlier queries. These outlier queries can then be sued to suggest new roles and users.

Figure 7:
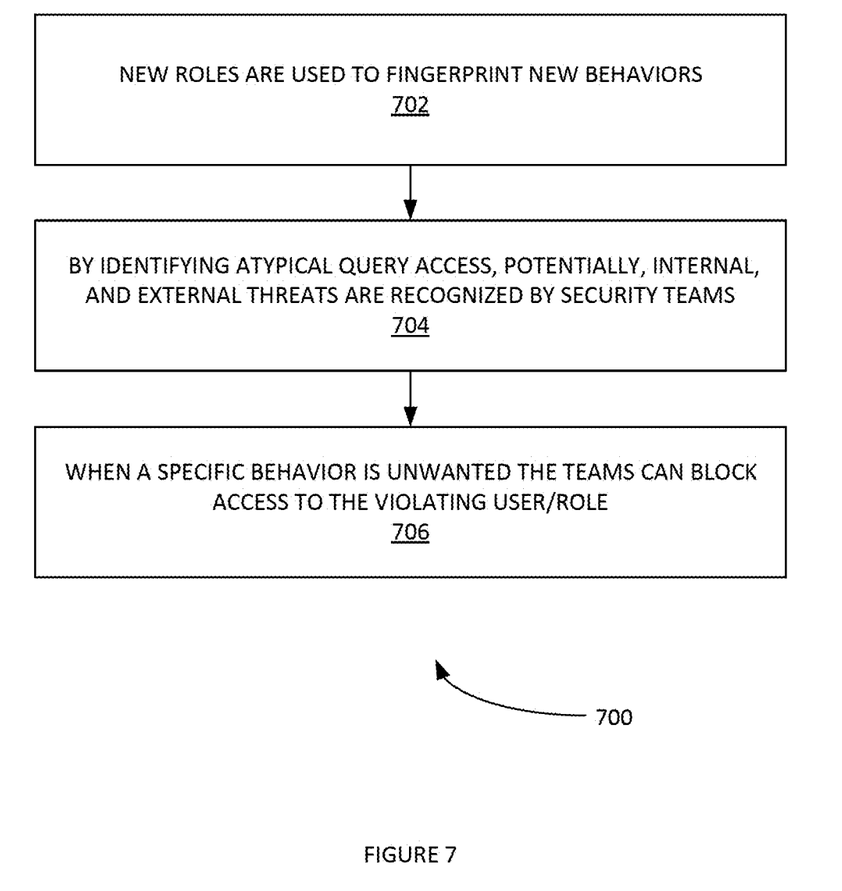
FIG. 7 illustrates an example process used to arrive at the atypical queries within a role and further use that information to suggest new roles to the security teams, according to some embodiments.

FIG. 7 illustrates an example process 700 used to arrive at the atypical queries within a role and further use that information to suggest new roles to the security teams, according to some embodiments. The new roles suggested help in two distinct ways based on the following steps. In step 702, the new roles are used to fingerprint new behaviors, thereby helping security teams to be on top of anomalous query access alerts. In step 704, by identifying atypical query access, potentially, internal, and external threats can be recognized by security teams. In step 706, when a specific behavior is unwanted the teams can block access to the violating user/role.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized system for locating anomalous query activity,
comprising:
at least one computer processor;
an atypical query engine:
analyzing data within a cloud-based database,
processing all accesses to the data within the cloud-based database and a SAAS environment,
generating a list of user that accesses a table from a location in the cloud-based database, and
capture a set of specified key statistics about the cloud-based database query; and
a role suggestion engine:
generating a user behavior fingerprint comprising a history of the user's behavior within the cloud-based database,
identifying that a user is an outlier with respect to behavior with respect to the set of specified key statistics, and
suggesting a new role within an enterprise managing the cloud-based database for the user, wherein the fingerprint of the outlier user is used to generate the suggestion for the new role.

2. The computerized system of claim 1 further comprising:
storing the set of specified key statistics in a data store.

3. The computerized system of claim 1, wherein the cloud-based database comprises a software as a service (SAAS) environment.

4. The computerized system of claim 1, wherein the list further comprises a user role when the user accessed the cloud-based database.

5. The computerized system of claim 4, wherein the list further comprises a time when the user accessed the cloud-based database.

6. The computerized system of claim 5, wherein the list further comprise a location from where the user accessed the cloud-based database.

7. The computerized system of claim 6, wherein the list comprises a specific device identifier that the user used to access the cloud-based database.

8. The computerized system of claim 7, wherein the list comprises a specified set of behavioral aspects of the user when the user accessed the cloud-based database.

9. The computerized system of claim 8, wherein the atypical query engine reviews a set of access patterns over a number of cloud-based database features.

10. The computerized system of claim 9, wherein the atypical query engine continuously evaluates to determine that a database query implemented on a table is normal based off other historical queries from a similar set of user fingerprints.

11. The computerized system of claim 10, wherein the atypical query engine understands different fingerprints of access as queries and querying users evolve.

12. The computerized system of claim 1, wherein the atypical query engine utilizes a set of specified machine learning algorithms to build a model for locating anomalous query activity.

13. The computerized system of claim 12, wherein the atypical query engine normalizes data relevant to a feature extraction and a query normalization.

14. The computerized system of claim 13, wherein the atypical query engine partitions obtained database queries depending on the role of the user and the table accessed in the database query.

15. The computerized system of claim 14, wherein there is a separate model for each new role for the user.

16. The computerized system of claim 15, wherein a model's distribution is built with a multi-dimensional generalization of database query behavior and specified relevant statistics.

* * * * *